United States Patent
Tan et al.

(10) Patent No.: US 10,146,726 B2
(45) Date of Patent: Dec. 4, 2018

(54) MOTHERBOARD AND ELECTRONIC DEVICE USING THE SAME

(71) Applicant: ASUSTeK COMPUTER INC., Taipei (TW)

(72) Inventors: Ji-Kuang Tan, Taipei (TW); Yu-Chen Lee, Taipei (TW); Bing-Min Lin, Taipei (TW); Ming-Hung Chung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 268 days.

(21) Appl. No.: 14/804,346

(22) Filed: Jul. 21, 2015

(65) Prior Publication Data

US 2016/0019181 A1    Jan. 21, 2016

(30) Foreign Application Priority Data

Jul. 21, 2014  (TW) .............................. 103213008 U
May 4, 2015   (TW) .............................. 104206777 U

(51) Int. Cl.
  *G06F 13/40*   (2006.01)
  *G06F 13/42*   (2006.01)
  *G06F 1/08*    (2006.01)
  *G06F 1/26*    (2006.01)

(52) U.S. Cl.
  CPC ............ *G06F 13/4282* (2013.01); *G06F 1/08* (2013.01); *G06F 1/26* (2013.01); *G06F 13/4068* (2013.01)

(58) Field of Classification Search
  None
  See application file for complete search history.

(56) References Cited

U.S. PATENT DOCUMENTS

| | | | | |
|---|---|---|---|---|
| 2003/0065863 | A1* | 4/2003 | Wyland ................. | G06F 13/385 710/305 |
| 2006/0279969 | A1* | 12/2006 | Leung ............... | H02M 3/33515 363/41 |
| 2007/0046309 | A1* | 3/2007 | LaBerge ................ | G11C 29/56 324/750.01 |
| 2013/0339917 | A1* | 12/2013 | Darringer ........... | G06F 17/5081 716/120 |
| 2014/0372631 | A1* | 12/2014 | Moore, Jr. .......... | G06F 13/4252 710/11 |
| 2015/0378960 | A1* | 12/2015 | Huffman ............. | G06F 13/4045 710/300 |

* cited by examiner

*Primary Examiner* — Henry Tsai
*Assistant Examiner* — Aurangzeb Hassan
(74) *Attorney, Agent, or Firm* — JCIPRNET

(57) ABSTRACT

A motherboard an electronic device using the same are provided. The motherboard includes a motherboard and a control chip. The processor is adapted to be inserted to a processor base including a plurality of pins. The pins is divided to defined pins and undefined pins. The processor base includes a plurality of electrical contacts. A first part of the electrical contacts are corresponding to the defined pins, and a second part of the electrical contacts are corresponding to the undefined pins. The control chip determines whether to make the motherboard enter an overclocking operation mode according to a control command. When the motherboard is set to be at the overclocking operation mode, the control chip transmits a control signal to the undefined pins of the processor via the second part of the electrical contacts, and then the processor improves operating efficiency.

10 Claims, 3 Drawing Sheets

MOTHERBOARD AND ELECTRONIC
DEVICE USING THE SAME

CROSS-REFERENCE TO RELATED
APPLICATION

This application claims the priority benefit of Taiwan application serial No. 103213008, filed on Jul. 21, 2014, and Taiwan application serial No. 104206777, filed on May 4, 2015. The entirety of each of the above-mentioned patent applications is hereby incorporated by reference herein and made a part of this specification.

BACKGROUND OF THE INVENTION

Field of the Invention

The invention relates to a motherboard and, more particularly, to a motherboard for an electronic device.

Description of the Related Art

Conventionally, a basic input output system (BIOS) of a motherboard provides different parameter setting options, users can change an operating voltage or a frequency operation of a control chip of the motherboard or a central processing unit (CPU) to improve efficiency of a computer system, which is called overvoltage and overclocking.

However, the CPU has a default parameter adjustable range in BIOS while manufactured, and users are only allowed to change the parameters within the range. The highest efficiency of the processor cannot be achieved.

BRIEF SUMMARY OF THE INVENTION

A motherboard and an electronic device having the motherboard are provided, which re-define the predetermined limitations of the processor, moreover, the performance of a processor are thus improved.

The motherboard is adapted for a processor. The processor includes a plurality of pins with defined pins and undefined pins. The motherboard includes a processor base and a control chip. The processor base includes a plurality of electrical contacts, the first part of the electrical contacts is corresponding to the defined pins, and the second part of the electrical contacts is corresponding to a part or all of the undefined pins. The control chip is coupled to the processor base. When the motherboard is set as an overclocking operation mode, the control chip transmits a control signal to the undefined pins of the processor via the second part of the electrical contacts.

In an embodiment, when the motherboard is set to be at the overclocking operation mode, the control chip detects load information of the processor and provides the control signal according to the load information to adjust an operating parameter of the processor.

In an embodiment, when the motherboard is set to be at the overclocking operation mode, the control chip controls an input voltage received by the processor to make the processor maintain at the same voltage under different loads.

In an embodiment, the second part of the electrical contacts includes a first group of the electrical contacts, and the first group of the electrical contacts is corresponding to a first group of the pins of the undefined pins.

In an embodiment, the control chip transmits a first control signal to the first group of the electrical contacts, and the processor responds to the first control signal to adjust a core ratio, a ring ratio, a memory ratio or a base clock frequency accordingly.

In an embodiment, the second part of the electrical contacts includes a second group of the electrical contacts, and the second group of the electrical contacts is corresponding to a second group of the pins of the undefined pins.

In an embodiment, the control chip transmits a second control signal to the second group of the electrical contacts, and the processor responds to the second control signal to adjust the core ratio, the ring ratio, the memory ratio or the base clock frequency accordingly.

The electronic device includes a function module, a processor and a motherboard. The processor includes a plurality of pins with defined pins and t undefined pins. The motherboard is coupled to the functional module and the processor. The motherboard includes a processor base and a control chip. The processor is inserted to the processor base and is coupled to the functional module via the processor base. The processor base includes a plurality of electrical contacts, the first part of the electrical contacts is coupled to the defined pins, and the second part of the electrical contacts is coupled to a part or all of the undefined pins.

The control chip is coupled to the processor base. The control chip transmits signals to the processor via the plurality of electrical contacts and determines whether to enter the overclocking operation mode according to the control command. When the motherboard is set to be at the overclocking operation mode, the control chip transmits the control signal to the undefined pins of the processor via the second part of the electrical contacts, and the processor responds to the control signal from the undefined pins.

In conclusion, the processor of the motherboard or the electronic device having the motherboard responds to the received control signal to adjust the operating parameter by providing the control signal to a part or all of the undefined pins of the processor. Consequently, the adjustable range of the operating parameter is not limited to an original architecture and the parameter range defined in the BIOS while manufactured, and users can adjust the parameters via the BIOS of the motherboard according practical requirements, and the stability and performance of the motherboard are improved effectively when overclocking.

BRIEF DESCRIPTION OF THE DRAWINGS

These and other features, aspects and advantages of the invention will become better understood with regard to the following embodiments and accompanying drawings.

DETAILED DESCRIPTION OF THE
EMBODIMENTS

Figure 1:
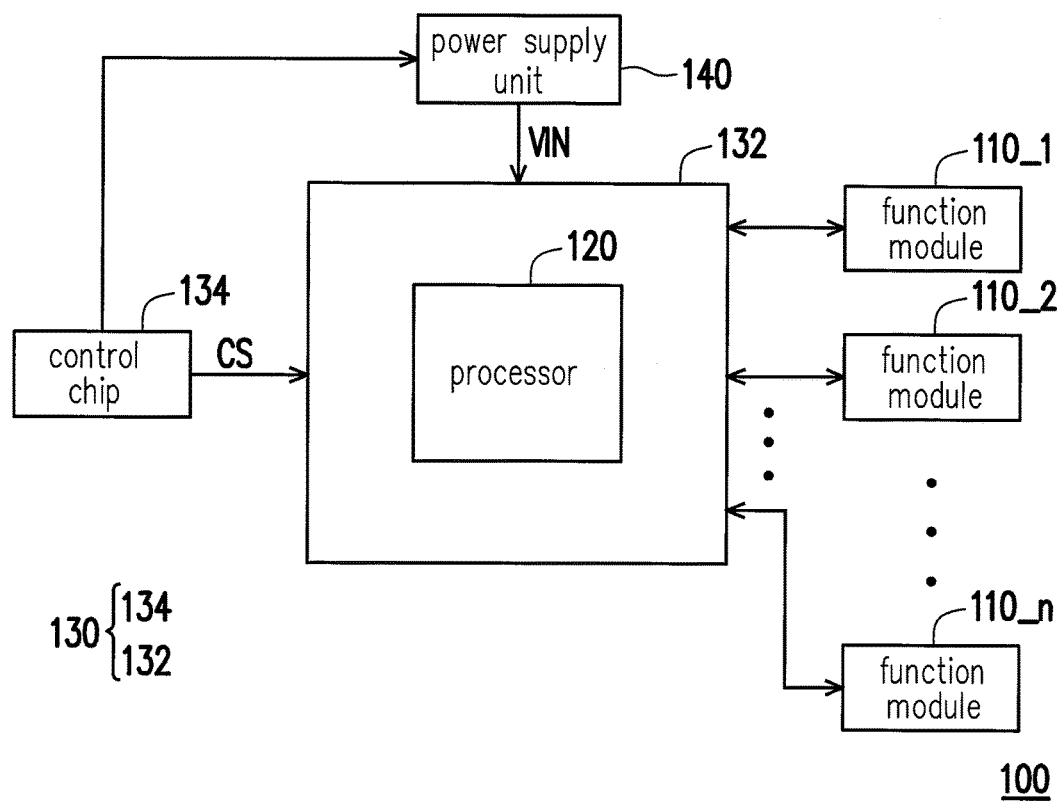
FIG. 1 is a functional block diagram showing an electronic device in an embodiment.

FIG. 1 is a functional block diagram showing an electronic device in an embodiment. Please refer to FIG. 1, in the embodiment, an electronic device 100 couples to functional modules 110_1 to 110_n, a processor 120, a motherboard 130 and a power supply unit 140. The electronic device 100 is a desktop, a laptop, a tablet, a smart phone, a personal digital assistant (PDA) or a game machine, which is not limited herein. The letter "n" herein means the number of the functional modules and can be any number which is a positive integer greater than or equal to 1, and is not limited herein.

In the embodiment, the functional modules 110_1 to 110_n are electronically connected to the processor 120 on the motherboard 130, which increase more applicable functions for the electronic device 100. In an embodiment, the functional modules 110_1 to 110_n are chipsets, Input/Output Ports, a power supply, a video card, a storage unit, and/or a CD-ROM driver/recorder, which is not limited herein.

The processor 120 processes and controls component of the electronic device 100, in an embodiment, the processor 120 receives an input voltage VIN from the power supply unit 140, to control the operation of the functional modules 110_1 to 110_n accordingly. Different operating parameters are stored in the processor 120, such as a core ratio, a ring ratio, a memory ratio or a base clock frequency, which is not limited herein. The operating parameters relating to operation efficiency of the processor 120 are a frequency of a core clock signal, a ring clock signal or a memory clock signal, which is not limited herein. The operating parameter is adjusted by setting basic input output system (BIOS) according by users' demand, the operating parameter can also be set additionally via the control chip 134 of the motherboard 130 (which will be illustrated hereinafter).

In the electronic device 100, the motherboard 130 is connected to varied functional modules 110_1 to 110_n and the processor 120. In detail, the motherboard 130 includes a processor base 132 and a control chip 134. The processor 120 is inserted to the processor base 132 to couple with the peripheral functional modules 110_1 to 110_n via the processor base 132, so as to transmit signals to the functional module 110_1 to 110_n.

Figure 2:
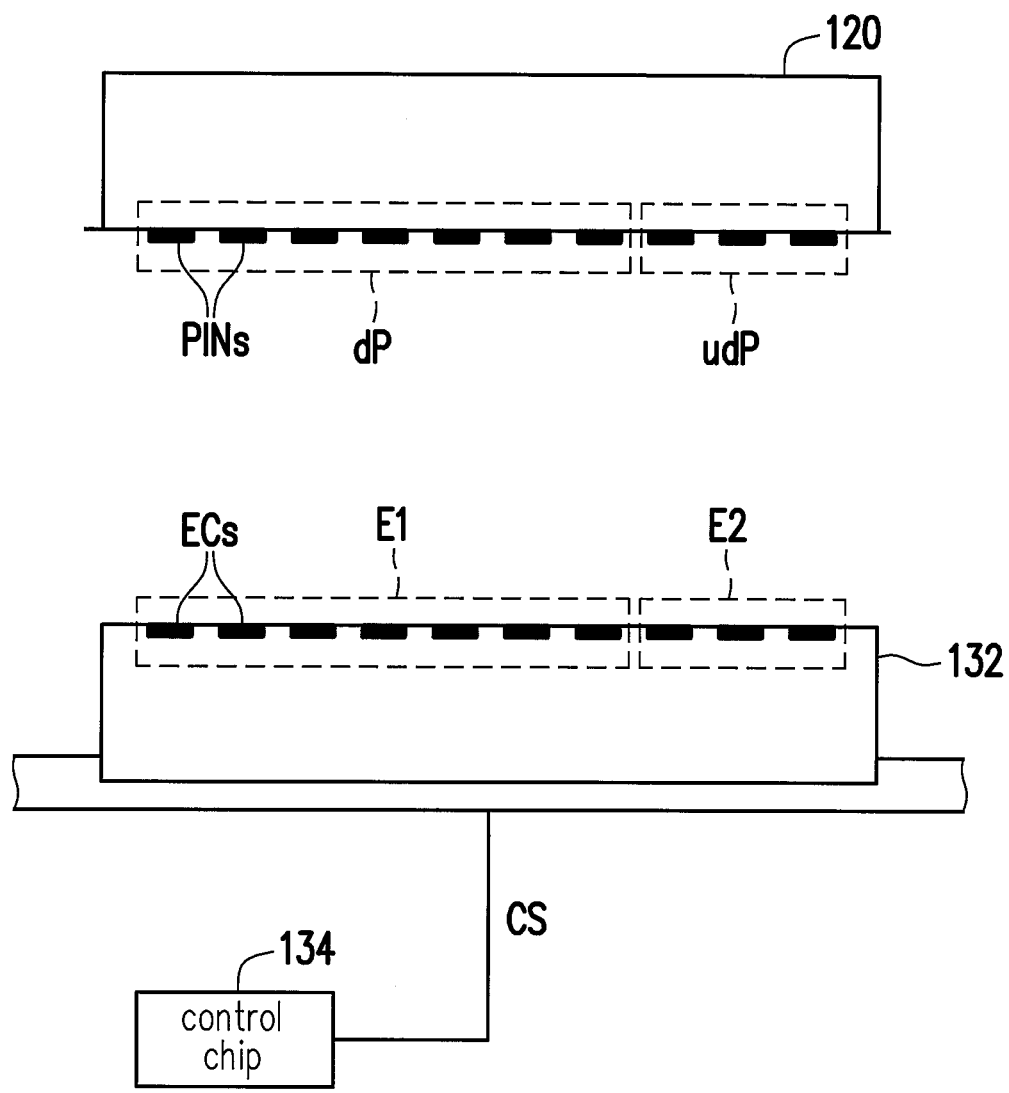
FIG. 2 is a schematic diagram showing configuration of a motherboard in an embodiment.

A configuration of the processor 120 and the motherboard 130 is further illustrated in FIG. 2. FIG. 2 is a schematic diagram showing the configuration of the motherboard in an embodiment.

Please refer to FIG. 1 and FIG. 2, the processor 120 includes a plurality of pins PINs. In the embodiment, a part of the pins PINs of the processor 120 are defined pins dP, and the other part of the pins PINs are undefined pins udP. The undefined pins udP include one or more pins PINs according to practical requirements. In addition, in an embodiment, the number of the pins PINs is 2084 or 1171, or the number is between 2012 to 2090, or between 1152 to 1180, which is not limited herein.

In the embodiment, the processor base 132 includes a plurality of electrical contacts ECs, and the electrical contacts ECs are disposed corresponding to the pins PINs of the processor 120. Similar to the configuration of the pins PINs of the processor 120, the electrical contacts ECs of the processor base 132 are divided to a first part of the electrical contacts E1 and a second part of the electrical contacts E2. The first part of the electrical contacts E1 of the processor base 132 are corresponding to the defined pins dP of the processor 120, the second part of the electrical contacts E2 of the processor base 132 are corresponding to a part or all of the undefined pins udP of the processor 120. In other words, when the processor 120 is inserted to the processor base 132, the defined pins dP are correspondingly connected to the first part of the electrical contacts E1, and a part or all of the undefined pins udP are connected to the second part of the electrical contacts E2 correspondingly.

The control chip 134 is coupled to the processor base 132, and the control chip 134 transmits signals to the processor 120 via the electrical contacts of the processor base 132. In the embodiment, the control chip 134 determines whether to enter an overclocking operation mode to improve the operating efficiency of the processor 120 according to a control command from a user. The control command can be generated by setting the BIOS or by external inputting, which is not limited herein.

In detail, when the motherboard 130 is not set as the overclocking operation mode (that is, keep in a normal operation mode), the processor 120 transmits signals to the control chip 134 and the functional module 110_1 to 110_n only via the defined pins dP and the corresponding first part of the electrical contacts E1. At the time, the undefined pins udP do not transmit signals, and the processor 120 operates under default setting.

On the other hand, when the motherboard 130 is set to the overclocking operation mode, the processor 120 transmits signals to other components via both the defined pins dP and the first part of the electrical contacts E1, the control chip 134 further transmits a control signal CS to the corresponding undefined pins udP via the second part of the electrical contacts E2. Since the processor 120 further receives the control signal CS from the undefined pins udP, the operating efficiency of the processor 120 is improved. For example, the processor 120 responds to the control signal CS received from the different pins PINs to adjust one or more of the core ratio, the ring ratio, the memory ratio and the base clock frequency according to the type or intensity of the control signal CS sent by the control chip 134 and the area of the electrical contacts ECs where the control signal CS is received, so as to improve the operating efficiency.

By setting the motherboard 130 to enter the overclocking operation mode, the control chip 134 provides the control signal CS to the undefined pins udP of the processor 120, and then the processor 120 responds to the control signal CS to adjust the operating parameter of the processor 120. Consequently, the adjustable range of the operating parameter is wider than an original range of the CPU as well as in the BIOS, and the user can adjust the parameters via the BIOS of the motherboard based on their requirements. As a result, the overclocking capability and performance of the processor 120 are improved effectively.

Figure 3:
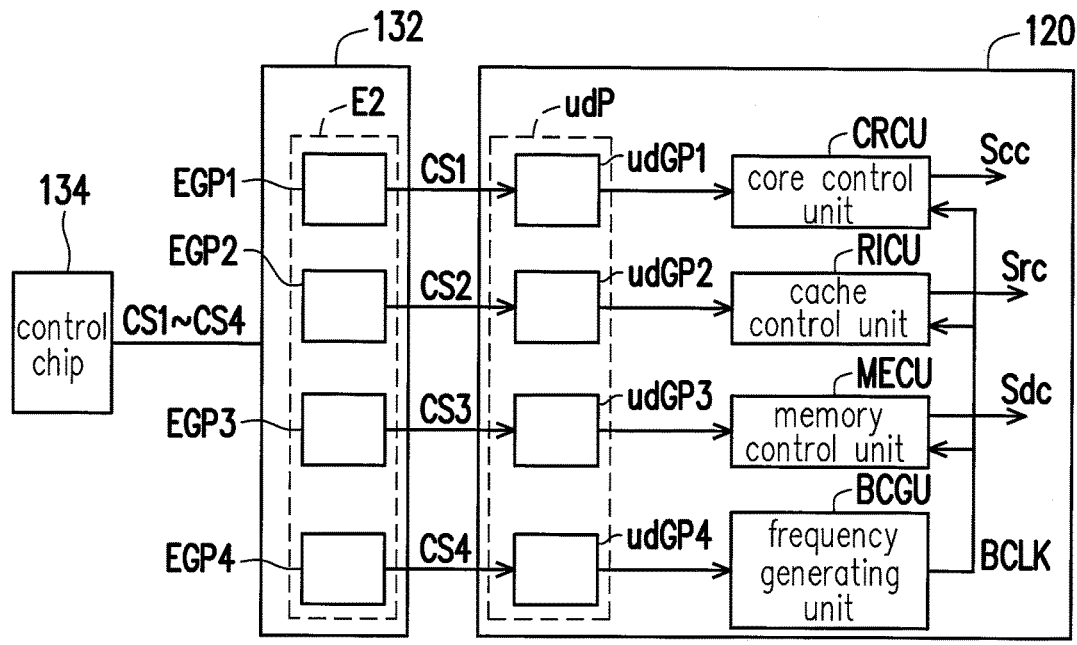
FIG. 3 is a functional block diagram showing a motherboard in an embodiment.

FIG. 3 is a functional block diagram showing a motherboard in an embodiment. Please refer to FIG. 3, in the embodiment, the second part of the electrical contacts E2 of the processor base 132 include a first group of the electrical contacts EGP1, a second group of the electrical contacts EGP2, a third group of the electrical contacts EGP3 and a fourth group of the electrical contacts EGP4.

The first group of the electrical contacts EGP1 are corresponding to a first group of the pins udGP1 of the undefined pins udP, the second group of the electrical contacts EGP2 are corresponding to a second group of the pins udGP2 of the undefined pins udP, the third group of the electrical contacts EGP3 are corresponding to a third group of the pins udGP3 of the undefined pins udP, and the fourth group of the electrical contacts EGP4 are corresponding to a fourth group of the pins udGP4 of the undefined pins udP. Moreover, in an embodiment, two or more groups of the first to fourth group of the electrical contacts EGP1 to EGP4 share same electrical contacts, which is not limited herein.

In an embodiment, the first group of the pins udGP1 are coupled to a core control unit CRCU, the second group of the pins udGP2 are coupled to a cache control unit RICU, the third group of the pins udGP3 are coupled to a memory control unit MECU, and the fourth group of the pins udGP4 are coupled to a frequency generating unit BCGU in the processor 120.

The core control unit CRCU generates a core clock signal Scc according to a core ratio and a base clock reference signal BCLK. The cache control unit RICU generates a ring clock signal Src according to a ring ratio and the base clock reference signal BCLK. The memory control unit MECU generates a memory clock signal Sdc according to the memory ratio and the base clock reference signal BCLK. The frequency generating unit BCGU generates the base clock reference signal BCLK according to the base clock frequency. The processor 120 controls the operation of the peripheral functional modules 110_1 to 110_n according to the core clock signal Scc, the ring clock signal Src and the memory clock signal Sdc.

In the embodiment, the core ratio of the core control unit CRCU, the ring ratio of the cache control unit RICU, the memory ratio of the memory control unit MECU and the base clock frequency of the frequency generating unit BCGU is adjustable via the BIOS, and the control signal CS1 to control signal CS4 sent from the control chip 134, respectively, in the overclocking operation mode.

In an embodiment, to set the core ratio, the control chip 134 transmits the control signal CS1 to the first group of the electrical contacts EGP1, then, the core control unit CRCU receives the control signal CS1 from the corresponding first group of the pins udGP1, and the core control unit CRCU responds to the control signal CS1 to adjust the core ratio higher or lower. As a result, the core control unit CRCU generates the core clock signal Scc according to the set core ratio and the set base clock reference signal BCLK.

In an embodiment, to set the ring ratio, the control chip 134 transmits the control signal CS2 to the second group of the electrical contacts EGP2, then, the cache control unit RICU receives the control signal CS2 from the corresponding second group of the pins udGP2, and the cache control unit RICU responds to the control signal CS2 to adjust the ring ratio higher or lower. As a result, the cache control unit RICU generates the ring clock signal Src according to the set ring ratio and the set base clock reference signal BCLK.

The method of the control chip 134 setting the memory ratio and the base clock frequency by transmitting the control signal CS3, CS4, respectively, can be referred to above embodiments, which is omitted herein.

In an embodiment, the second part of the electrical contacts E2 of the processor base 132 further include one or more groups of the first to fourth group of the electrical contacts EGP1 to EGP4, so as to adjust the corresponding one or more of the core ratio, the ring ratio, the memory ratio and the base clock frequency accordingly. In other embodiments, the configuration of the motherboard is various, the control chip of the motherboard controls to transmit the control signal from the processor to the undefined pins of the processor via the electrical contacts of the processor base, the processor responds to the control signal to adjust at least one of the core ratio, the ring ratio, the memory ratio or the base clock frequency, those various configurations are all in the scope of the disclosure.

In an embodiment, the control chip 134 further detects the load information of the processor 120 and provides the corresponding control signal CS1 to CS4 to adjust the operating parameter of the processor 120 accordingly, and then the voltage drop is avoided in the processor 120 under heavy load, and the stability of the overclocking performance is improved.

Figure 4:
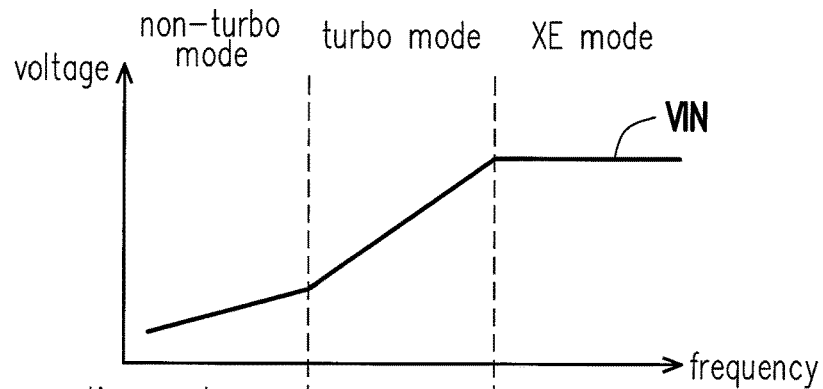
FIG. 4 is a schematic diagram showing performance characteristic of a processor in an embodiment.
Figure 4:
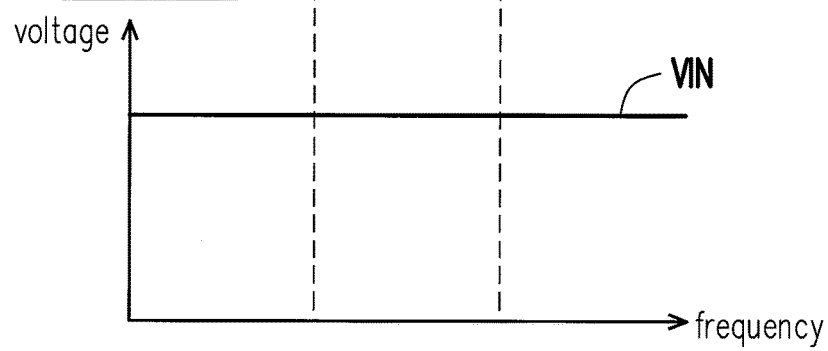

In an embodiment, instead of a predetermined and fixed power supply mode conventionally, the power supply unit 140 has a plurality of power supply modes to supply power to the processor 120, the stability of the overclocking is further improved. The detail is illustrated accompanying the embodiment in FIG. 4 hereafter. FIG. 4 is a schematic diagram showing performance characteristic of a processor in an embodiment.

Please refer to FIG. 1 and FIG. 4, when the processor 120 is set to be a normal operation mode, the power supply unit 140 supplies power in an offset mode as shown in the upper figure of FIG. 4. In the offset mode, the input voltage YIN provided by the power supply unit 140 has different voltage input characteristics with different operating frequencies/loads of the processor 120.

In the embodiment, according to the different operating frequencies/loads of the processor 120, the voltage input characteristics is divided to a non-turbo mode, a turbo mode and an overloading mode (XE mode). In the three modes, the power supply unit 140 provides the input voltage VIN according to three characteristic curves with different slopes. In other words, the input voltage VIN provided by the power supply unit 140 changes with the operating frequencies/loads of the processor 120 in the offset mode.

On the other hand, as shown in the lower figure of FIG. 4, when the motherboard 130 is set to be the overclocking operation mode, the control chip 134 controls the power supply unit 140 according to the load information, and then the power supply unit 140 supplies power to the processor 120 in an override mode. In the override mode, the input voltage VIN provided by the power supply unit 140 maintains at a constant setting value (which can be set by users), and the input voltage VIN does not change with the operating frequencies/loads of the processor 120. In other words, in the override mode, the processor 120 always maintains the same voltage under different loads.

In the overclocking mode, the power supply method in offset mode cannot meet the requirements on the system stability. In the embodiment, according to architecture of the motherboard 130, when the processor 120 is set to be at the overclocking operation mode, the control chip 134 controls the power supply unit 140 to supply power to the processor 120 in the override mode according to the detected load information, and then the input voltage VIN maintains the same voltage under different loads, the stability of the overclocking is improved.

In sum, the motherboard provides the control signal to a part or all of the undefined pins of the processor, and then the processor responds to the control signal to adjust the operating parameter. Consequently, the adjustable range of the operating parameter is not limited man original architecture when the CPU leaves factory and the parameter range defined in the BIOS, and the user can adjust the parameters via the BIOS of the motherboard according to practical requirements, and the overclocking capability and performance of the motherboard are improved effectively.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. A motherboard, adapted to a processor including a plurality of pins with defined pins and undefined pins, and the motherboard includes:
   a processor base, including a plurality of electrical contacts, a first part of the electrical contacts are corresponding to the defined pins of the processor, a second part of the electrical contacts are corresponding to a part or all of the undefined pins of the processor; and a control chip, coupled to the processor base, transmitting a control signal to the undefined pins of the processor via the second part of the electrical contacts in an overclocking operation mode, wherein the second part of the electrical contacts include a first group of the electrical contacts, which corresponds to a first group of the pins of the undefined pins, the control chip transmits the first control signal to the first group of the electrical contacts to make the processor respond to the first control signal to adjust the core ratio, the ring ratio, the memory ratio or the base clock frequency.

2. The motherboard according to claim 1, wherein the control chip detects load information of the processor and provides the control signal accordingly to adjust an operating parameter of the processor in the overclocking operation mode.

3. The motherboard according to claim 2, wherein the control chip further controls an input voltage received by the processor according to the load information to maintain the processor at a same voltage under different loads in the overclocking operation mode.

4. The motherboard according to claim 1, wherein the second part of the electrical contacts include a second group of the electrical contacts which corresponds to a second group of the pins of the undefined pins.

5. The motherboard according to claim 4, wherein the control chip transmits a second control signal to the second group of the electrical contacts to make the processor respond to the second control signal to adjust core ratio, the ring ratio, the memory ratio or the base clock frequency.

6. An electronic device, comprising:
a function module;
a processor, including a plurality of pins with defined pins and undefined pins; and
a motherboard, coupled to the functional module and the processor, includes:
a processor base, wherein the processor is coupled to the functional module via the processor base, the processor base includes a plurality of electrical contacts, a first part of the electrical contacts are coupled to the defined pins of the processor, and a second part of the electrical contacts are coupled to a part or all of the undefined pins of the processor; and a control chip, coupled to the processor base, transmitting signals to the processor via the electrical contacts and determines whether to make the motherboard enter an overclocking operation mode according to a control command, wherein the control chip transmits a first control signal to the second part of the electrical contacts to make the processor respond to the first control signal, wherein the second part of the electrical contacts include a first group of the electrical contacts, and the first group of the electrical contacts are corresponding to a first group of the pins of the undefined pins the control chip transmits the first control signal to the first group of the electrical contacts to make the processor respond to the first control signal to adjust one of the core ratio, the ring ratio, the memory ratio and the base clock frequency.

7. The electronic device according to claim 6, wherein the control chip detects load information of the processor and provides the control signal according to the load information to adjust an operating parameter of the processor in the overclocking operation mode.

8. The electronic device according to claim 7, wherein the control chip further controls an input voltage received by the processor according to the load information to make the processor maintain at a same voltage under different loads in the overclocking operation mode.

9. The electronic device according to claim 6, wherein the second part of the electrical contacts include a second group of the electrical contacts, and the second group of the electrical contacts are corresponding to a second group of the pins of the undefined pins.

10. The electronic device according to claim 9, wherein the control chip transmits a second control signal to the second group of the electrical contacts to make the processor respond to the second control signal to adjust one of the core ratio, the ring ratio, the memory ratio and the base clock frequency.

* * * * *